(12) United States Patent
Wilson et al.

(10) Patent No.: US 9,147,895 B2
(45) Date of Patent: Sep. 29, 2015

(54) FUEL CELL FUEL RECYCLE EJECTORS DISPOSED IN FUEL MANIFOLD

(75) Inventors: Matthew P. Wilson, Groton, CT (US); Christopher John Carnevale, Vernon, CT (US); Jeffrey G. Lake, Vernon, CT (US); Michael D. Harrington, Windsor Locks, CT (US)

(73) Assignee: Audi AG, Ingolstadt (DE)

( * ) Notice: Subject to any disclaimer, the term of this patent is extended or adjusted under 35 U.S.C. 154(b) by 78 days.

(21) Appl. No.: 13/261,310

(22) PCT Filed: Dec. 8, 2009

(86) PCT No.: PCT/US2009/006451
§ 371 (c)(1),
(2), (4) Date: Jun. 5, 2012

(87) PCT Pub. No.: WO2011/071466
PCT Pub. Date: Jun. 16, 2011

(65) Prior Publication Data
US 2012/0244455 A1    Sep. 27, 2012

(51) Int. Cl.
*H01M 8/04* (2006.01)
*H01M 8/24* (2006.01)

(52) U.S. Cl.
CPC ...... *H01M 8/04089* (2013.01); *H01M 8/04097* (2013.01); *H01M 8/24* (2013.01); *Y02E 60/50* (2013.01)

(58) Field of Classification Search
CPC ..... H01M 8/04; H01M 8/04089; H01M 8/24; H01M 8/04097; Y02E 60/50
USPC ......................................................... 429/513
See application file for complete search history.

(56) References Cited

U.S. PATENT DOCUMENTS

| 3,982,961 A * | 9/1976 | Grasso ......................... 429/415 |
| 2007/0087254 A1 | 4/2007 | Iyengar et al. |
| 2007/0163649 A1 | 7/2007 | Yamagishi et al. |

FOREIGN PATENT DOCUMENTS

| KR | 100801658 B1 | 2/2008 |
| KR | 20090094904 * | 9/2009 |
| WO | 2008/076112 A1 | 6/2008 |

OTHER PUBLICATIONS

PCT International Search Report mailed on Aug. 25, 2010 for PCT Application No. PCT/US2009/006451 (3 pages).

* cited by examiner

*Primary Examiner* — Gary Harris
(74) *Attorney, Agent, or Firm* — Seed IP Law Group PLLC

(57) ABSTRACT

Ejectors (22, 59) are configured to receive fresh fuel gas at the motive inlet (27, 60) and to receive fuel recycle gas at the suction inlet (29, 64, 65). Each ejector is disposed either a) within a fuel inlet/outlet manifold (13, 109) or adjacent to and integral with the fuel inlet/outlet manifold. The ejector draws fuel recycle gas directly from the fuel outlet manifold and, after mixing with fresh fuel, is expanded (34, 76) to lower the pressure and is then fed directly into the fuel inlet manifold (14, 80, 109). The ejector may be within an external manifold (13, 92) or an internal manifold (109). The ejector (59) may be formed of perforations clear through a plate (80), which is closed on either side by other plates (83, 85), or the ejector may be formed by suitable sculpture of fuel cells (12) having internal fuel inlet (109) and fuel outlet (15) manifolds.

15 Claims, 4 Drawing Sheets

FUEL CELL FUEL RECYCLE EJECTORS DISPOSED IN FUEL MANIFOLD

TECHNICAL FIELD

High pressure fuel provided to the motive inlet of ejectors draws fuel recycle gas through the suction inlet of the ejectors, the ejectors being disposed within an external or internal fuel manifold. The suction inlets may be disposed in the fuel outlet portion of a fuel inlet/outlet manifold, and the exit of the ejector may provide fuel directly into the fuel inlet manifold portion.

BACKGROUND ART

Operation of a fuel cell stack assembly requires that the fuel gas be evenly distributed equally to all of the fuel cells in order to avoid fuel starvation. This has historically been accomplished using fuel distribution manifold devices within the fuel inlet manifolds having layers of evenly splitting the fuel flow into two flows, such as four layers, ending with 16 fuel inlets.

In order to achieve maximum efficiency of a fuel cell power plant, there is a need to recycle the anode exit gas back to the inlet of the anodes in order to extract the still usable fuel in the anode exhaust. Typically, this has historically been accomplished using an external hydrogen recycle blower and external plumbing. Ejectors have been used in which fresh fuel at the motive input provides the suction to draw recycle fuel into the suction inlet of the ejector.

Compared to external fuel inlet manifolds, internally manifolded fuel cell stacks offer benefits including lower cost, lower manufacturing time, minimized complexity, etc. External manifolds are used, especially at the anode, to accommodate large inlet fuel distribution devices, to achieve even reactant distribution to all of the cells. Achieving even distribution becomes difficult when dealing with internal manifolds. Utilizing a high pressure drop device provides the necessary even distribution, but high pressure devices limit the use of available anode exhaust recycle devices.

SUMMARY

A mixture of fresh fuel and fuel recycle gas is accomplished with ejectors mounted within or adjacent to a fuel manifold of a fuel cell power plant. In some embodiments, the outlet of the ejectors is disposed within a fuel inlet manifold and the suction inlet of the ejectors are disposed in the fuel outlet manifold, requiring no plumbing for the fuel recycle gas. Ejectors may be disposed in either internal or external fuel inlet or fuel inlet/outlet manifolds. The embodiments herein achieve adequate fuel distribution by means of high pressure fuel being provided to the motive inlet of the ejectors.

Other variations will become more apparent in the light of the following detailed description of exemplary embodiments, as illustrated in the accompanying drawings.

MODE(S) OF IMPLEMENTATION

Figure 1:
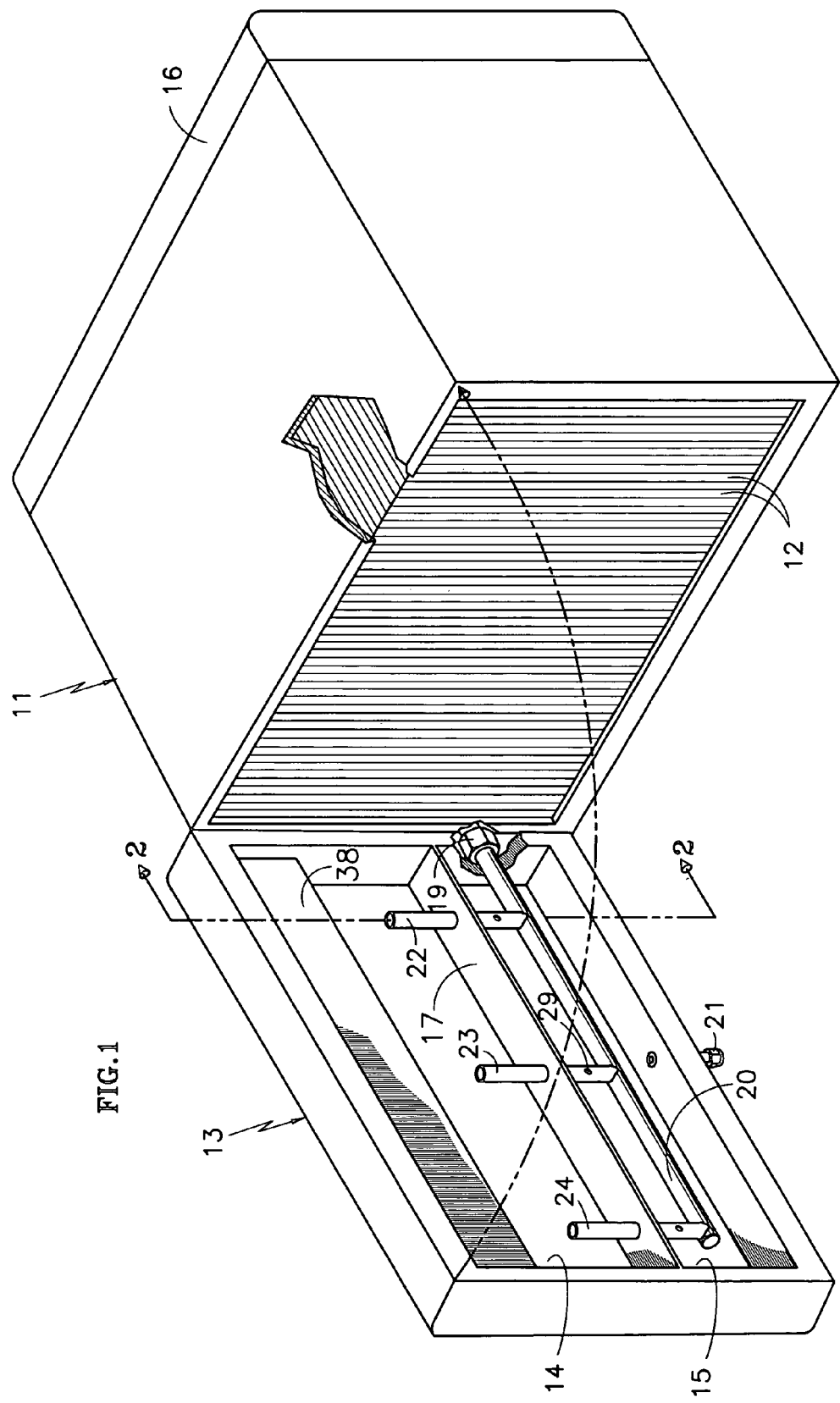
FIG. 1 is a simplified, stylized perspective view of a fuel cell stack employing a fuel inlet/outlet manifold having ejectors disposed in the inlet/outlet separator so as to draw recycle fuel gas directly into the suction port of the ejector and so as to emit the mixture of fresh and recycle fuel directly into the fuel inlet manifold.
Figure 2:
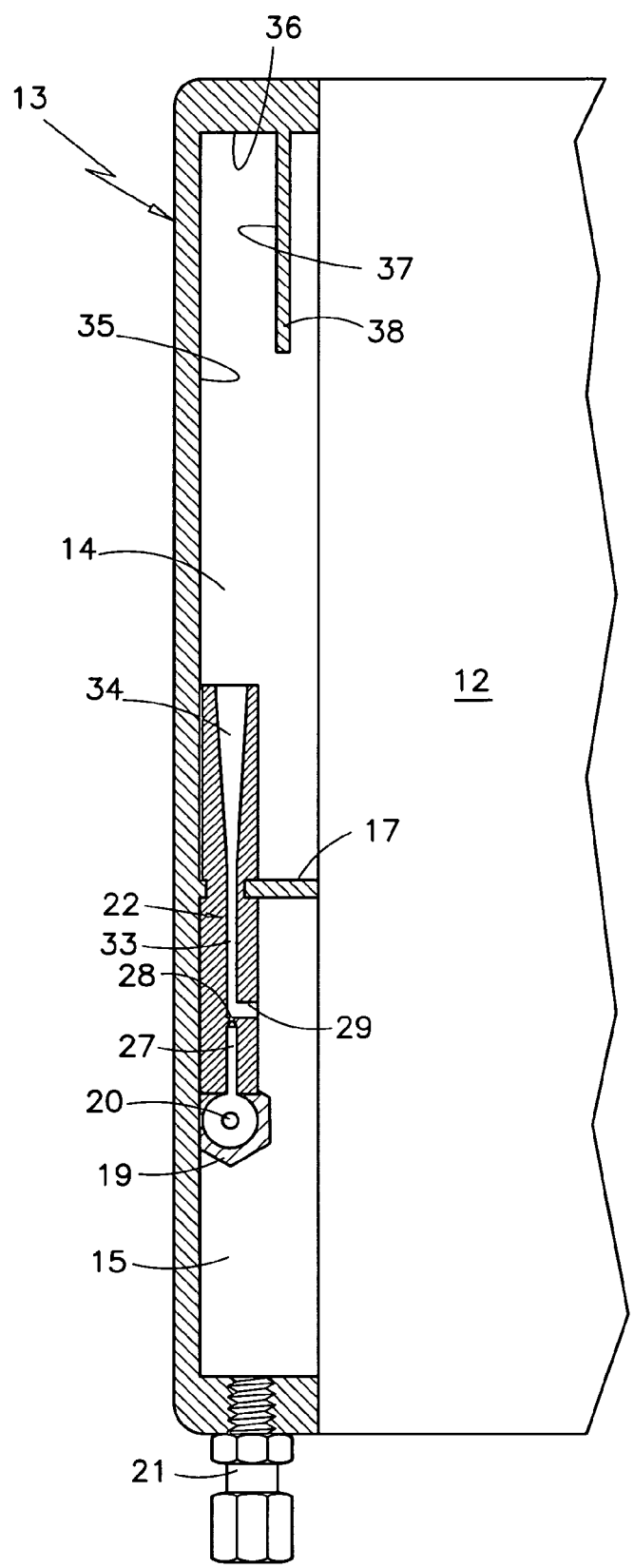
FIG. 2 is a sectional view taken on the line 2-2 in FIG. 1.

A first embodiment is illustrated in FIGS. 1 and 2. In FIG. 1, a stack 11 of fuel cells 12 is provided with a fuel inlet/outlet manifold 13, which includes a fuel inlet manifold 14 and a fuel outlet manifold 15. A fuel divider 17 causes the inlet fuel to pass through the upper portion of each of the fuel cells 12, then be re-directed in a fuel turn manifold 16 to pass through the lower portion of the fuel cells 12 to the fuel outlet manifold 15.

The fuel outlet manifold 15 has an outlet port 21 which will typically connect with a purge valve which is operated either intermittently or at a very low flow in order to eliminate unwanted gases, mainly nitrogen, from the recycle gas. In FIG. 1, the top and bottom of the stack 11 would typically have air inlet and air outlet manifolds, which have been omitted herein for clarity.

Fresh fuel is provided through a fuel inlet port 19 and a fuel inlet conduit 20 to three ejectors 22, 23, 24. Referring to FIG. 2, the ejector 22, as well as the other ejectors 23, 24, receives high pressure fresh fuel from the conduit 20 into an inlet 27 which terminates in the ejector orifice 28. The fresh hydrogen passing through the orifice 28 draws anode exhaust gas from the fuel outlet manifold 15 through the suction inlet 29. The mixture of fresh fuel and fuel recycle gas passes along a mixing portion 33 of the ejector 22 into a diffuser portion 34 in which the pressure of the gas is reduced. The mixture of fresh fuel and fuel recycle gas then impinges on the surfaces 35, 36 of the fuel inlet/outlet manifold as well as on a surface 37 of a baffle 38. The baffle assists in causing the fuel mixture to be more evenly distributed among all of the fuel cells.

Because the fresh fuel enters the conduit 20 at relatively high pressure (about 1400 kPa, 200 psi), the fuel is distributed essentially evenly between the three ejectors 22-24, and provides substantially the same vacuum and therefore the same volume of recycle gas that is ingested through the suction inlet 29 from the fuel outlet manifold 15. Having the suction inlet 29 of the ejector 22-24 disposed in the fuel outlet manifold 15, and having the outlet of the ejector 22 direct the fuel into the fuel inlet manifold 14 eliminates weight, expense and complexity of plumbing which has heretofore been required.

The ejectors 22 may be machined in metal or a suitable plastic; or they may be fashioned of a suitable material in some other fashion.

Figure 3:
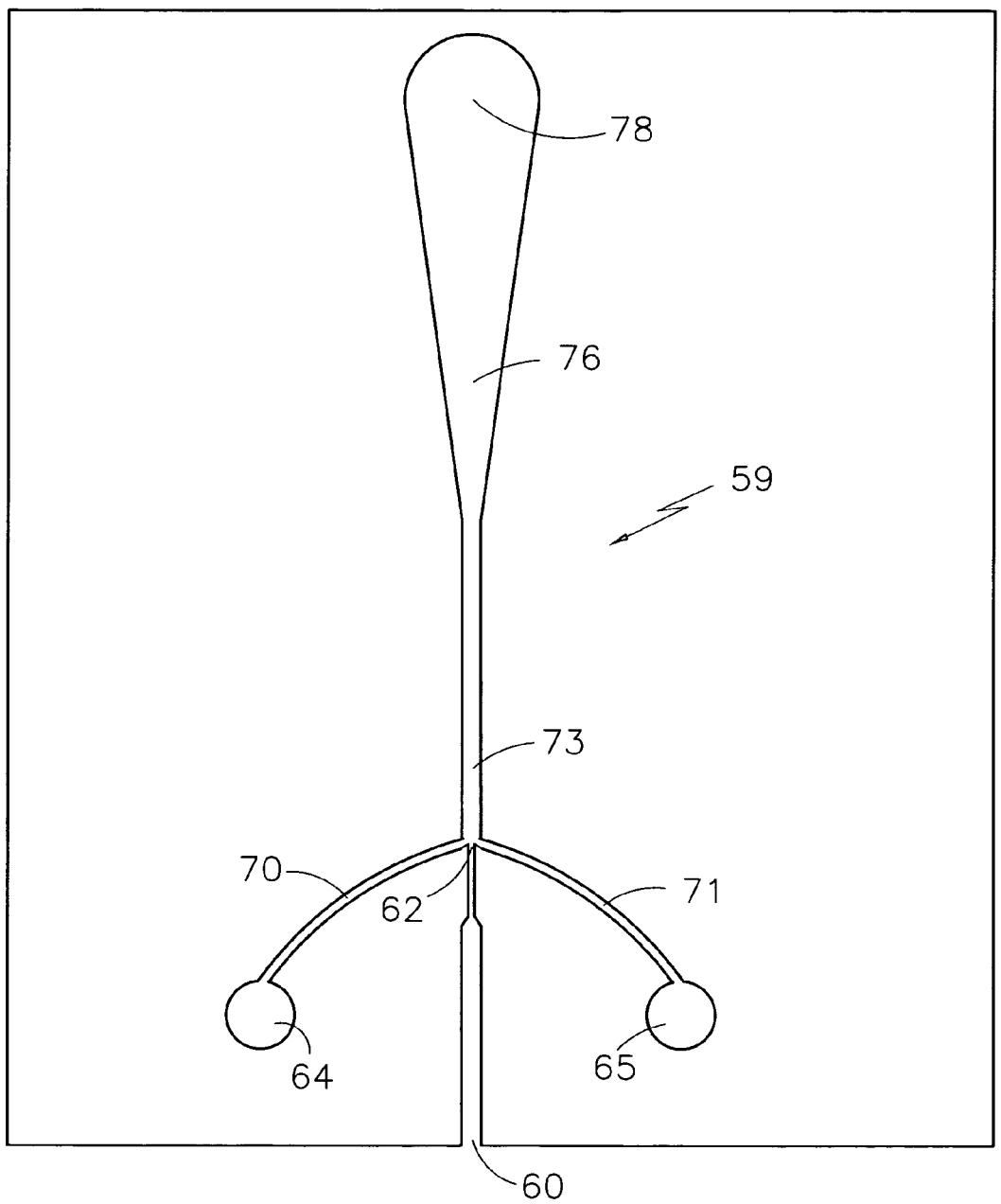
FIG. 3 is a front elevation view of a flat plate ejector.
Figure 4:
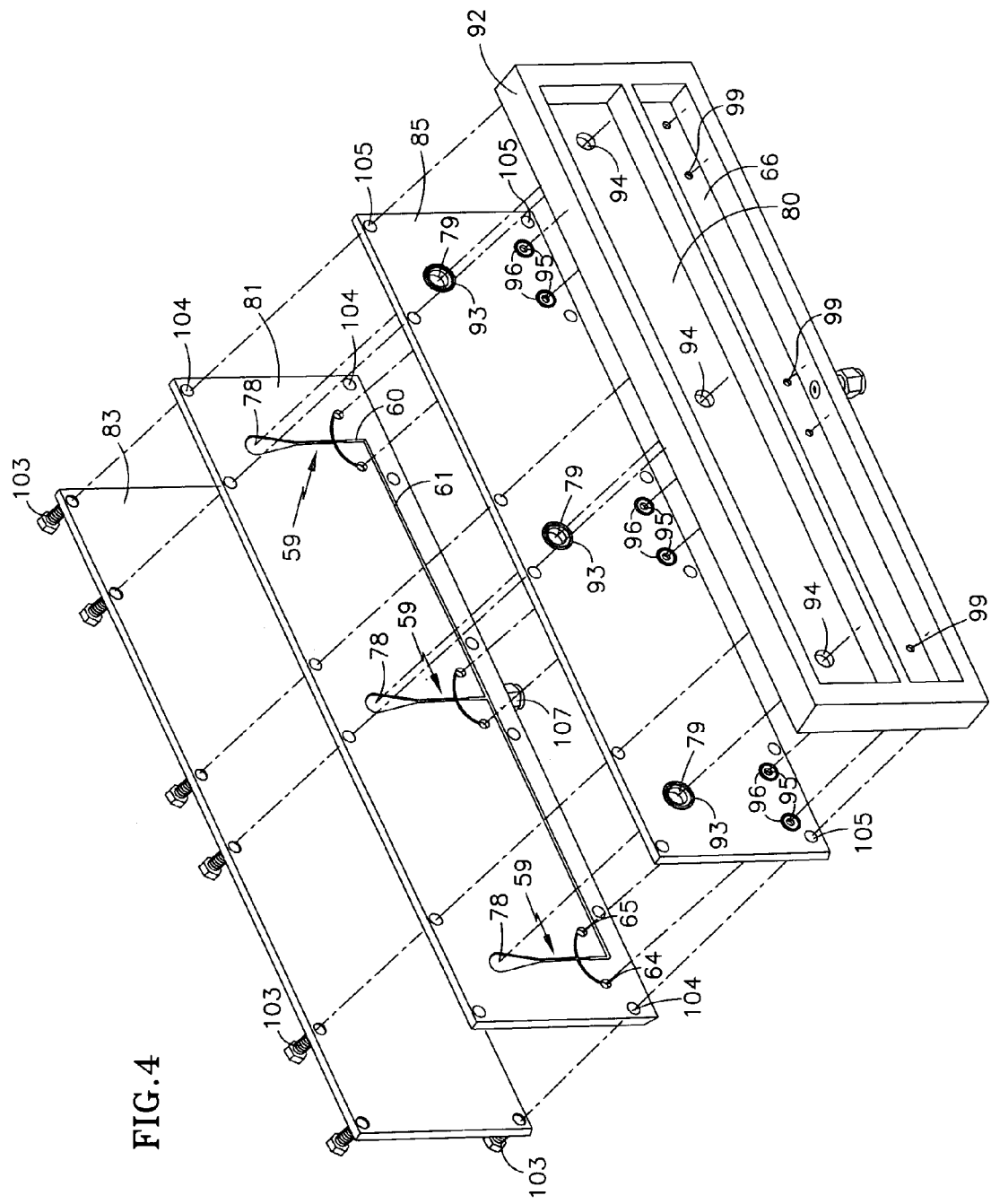
FIG. 4 is an exploded perspective of a fuel inlet/outlet manifold coupled to a plurality of flat plate ejectors of the type illustrated in FIG. 3.

Another embodiment employs a flat plate, perforated clear through in a pattern to form an ejector 59, illustrated in FIGS. 3 and 4. In FIG. 3, a fuel inlet passage 60 receives fuel from a fuel inlet conduit 61 (FIG. 4) and terminates in the ejector nozzle 62. There are two recycle ports 64, 65 which, as described hereinafter with respect to FIG. 4, are in fluid communication with the fuel exit manifold 66. The ports 64, 65 are connected by conduits 70, 71 to the proximal end of a mixing tube 73, right at the nozzle 62. The high pressure fuel passing through the nozzle 62 into the mixing tube 73 draws recycle fuel from the ports 64, 65, causing the anode exhaust fuel to be mixed with the fresh (neat) inlet fuel provided in the fuel inlet passage 60. The fuel passes along the mixing tube 73 and enters into a diffuser portion 76, eventually reaching a point 78 which is aligned with a hole 79 (described hereinafter with respect to FIG. 4) which allows the fuel to flow directly into the fuel inlet manifold 80.

Referring to FIG. 4, three ejectors 59 are formed as cuts, clear through an ejector plate 81. The backside of the ejector plate 81 is sealed off by a plate 83, and the front of the ejector plate 81 is sealed off by a plate 85. The holes 79 allow the mix of fresh fuel and recycle fuel to pass directly to fuel inlet manifold 80, which is a chamber in a fuel inlet/outlet manifold structure 92. O-rings 93 assure a fluid seal with holes 94 in the fuel inlet/outlet manifold structure 92. Similarly, holes 95 with O-rings 96 align with holes 99 through the fuel inlet/outlet manifold structure 92 so that the fuel exit manifold 66 is in fluid communication with the recycle ports 64, 65 in the ejectors 59. A plurality of bolts 103 pass through holes 104, 105 in the plates 80, 85 so as to draw the plates 80, 83, 85 tightly to, and in gas sealed relationship, with the fuel inlet/outlet manifold structure 92.

Fresh fuel is provided by suitable plumbing through a fixture 107, through the fuel inlet conduit 66 and into the ejectors 59. When the fuel reaches the point 78 in the ejectors, it will pass through the holes 79 and co-aligned holes 94 into the fuel inlet manifold 80.

Although the prior examples include only three ejectors each, which will accommodate smaller fuel cell power plants of, for instance, about 30 or 40 fuel cells, either embodiment could contain a higher number of ejectors, such as 8 or 10, for larger fuel cell power plants.

The two previous embodiments comprise external fuel inlet/outlet manifolds. Another embodiment will take integral ejectors 22, of the type illustrated in FIGS. 1 and 2, and simply place them at various positions along internal inlet/outlet manifolds. Such ejectors may be inserted into holes made therefor in that part of the inlet/outlet configuration which provides the barrier 17. Other embodiments may be fashioned within the teachings herein.

If found desirable in any implementation, inlet fuel distribution devices, such as those shown in patent publications US 2005/0129999 and US 2006/0280995, may be placed upstream of the ejectors, to assure feeding fuel to the ejectors equally, and simultaneously on startup.

The invention claimed is:

1. An ejector device for a fuel cell stack, the ejector device comprising:
a flat ejector plate having opposing surfaces and being perforated clear through the flat ejector plate from one of the opposing surfaces to the other in a direction perpendicular to the opposing surfaces and in a pattern to form at least one ejector, the at least one ejector including a nozzle, an ejector gas motive inlet in fluid communication with the nozzle, a mixing portion, an expansion area, at least one gas suction inlet and at least one conduit extending from the at least one gas suction inlet toward the mixing portion, and wherein the ejector is configured to draw gas from the at least one gas suction inlet via the at least one conduit into the mixing portion to be led toward the expansion area.

2. A fuel cell assembly comprising the ejector device of claim 1 and further comprising:
a first plate completely closing off a first side of the perforations forming said ejector of the flat ejector plate of the ejector device; and
a second plate closing off a second side of the perforations forming said ejector of the flat ejector plate of the ejector device except for perforations in said second plate providing passageways for fluid communication with said ejector gas motive inlet, said recycle at least one gas suction inlet port and a downstream end of said expansion area.

3. A fuel cell assembly comprising the ejector device of claim 2 and further comprising:
a fuel inlet/outlet manifold having a fuel inlet chamber and a fuel outlet chamber, said inlet/outlet manifold having perforations providing fluid communication from the downstream end of said expansion area to said fuel inlet chamber and having perforations providing fluid communication between said at least one gas suction inlet and the fuel outlet chamber of said fuel inlet/outlet manifold.

4. The ejector device of claim 1 wherein the flat ejector plate is perforated clear through the flat ejector plate from one of the opposing surfaces to the other in a pattern to form a linear array of ejectors.

5. The ejector device of claim 1 wherein the at least one ejector is symmetric about a plane of symmetry and includes two gas suction inlets, each gas suction inlet being located on a respective side of the plane of symmetry.

6. The ejector device of claim 1 wherein the at least one ejector includes an ejector outlet portion at a downstream end of the expansion area, the ejector outlet portion being located at a second end of the flat ejector plate that is opposite to a first end of the flat ejector plate where the ejector gas motive inlet is located.

7. The ejector device of claim 1 wherein the ejector includes at least two gas suction inlets and each gas suction inlet is in fluid communication with the mixing portion by a respective conduit.

8. An ejector device for a fuel cell stack, the ejector device comprising:
an ejector plate having opposing surfaces and at least one ejector aperture that passes completely through the ejector plate from one of the opposing surfaces to the other and in a direction perpendicular to the opposing surfaces, the ejector aperture including:
an inlet portion located at a first end of the ejector plate;
a nozzle downstream of the inlet portion;
a mixing portion downstream of the nozzle;
a diffusion portion downstream of the mixing portion;
an ejector outlet portion downstream of the diffusion portion, the ejector outlet portion located at a second end of the ejector plate that is opposite to the first end of the ejector plate;
at least one gas recycle port; and
at least one conduit extending from the at least one gas recycle port toward the mixing portion, and
wherein the ejector is configured to draw gas from the at least one gas recycle port via the at least one conduit into the mixing portion to be led toward the ejector outlet portion.

9. The ejector device of claim 8 wherein the ejector outlet portion is wider than the diffusion portion, the mixing portion, the nozzle, and the inlet portion.

10. The ejector device of claim 8 wherein the ejector aperture includes at least two gas recycle ports and each gas recycle port is in fluid communication with the mixing portion by a respective conduit.

11. The ejector device of claim 10 wherein the at least two gas recycle ports are located on opposing sides of the nozzle portion.

12. A fuel cell assembly comprising:
an arrangement of fuel cells; and
an ejector plate having opposing surfaces and at least one ejector aperture that passes completely through the ejector plate from one of the opposing surfaces to the other and in a direction perpendicular to the opposing surfaces, the ejector aperture being configured to draw gas from at least one gas recycle port into a mixing portion downstream of a nozzle to be led to an expansion area of the ejector aperture for input into the arrangement of fuel cells.

13. The fuel cell assembly of claim 12, further comprising:
a first plate completely closing off a first side of the ejector aperture of the ejector plate; and
a second plate closing off a second side of the ejector aperture of the ejector plate apart from areas corresponding to apertures in the second plate that provide passageways for fluid communication with a gas inlet portion of the ejector aperture, the at least one gas recycle port and a downstream end of the expansion area.

14. The fuel cell assembly of claim 13, further comprising:
a fuel inlet/outlet manifold having a fuel inlet chamber and a fuel outlet chamber, and including at least one aperture that provides fluid communication between the downstream end of the expansion area and the fuel inlet chamber and at least one aperture that provides fluid communication between the at least one gas recycle port and the fuel outlet chamber.

15. The fuel cell assembly of claim 13 wherein the ejector plate includes a linear array of ejector apertures, each ejector aperture passing completely through the ejector plate from one of the opposing surfaces to the other and being configured to draw gas from at least one respective gas recycle port into a respective mixing portion downstream of a respective nozzle to be led to a respective expansion area of the ejector aperture for input into the arrangement of fuel cells.

* * * * *

UNITED STATES PATENT AND TRADEMARK OFFICE
CERTIFICATE OF CORRECTION

PATENT NO. : 9,147,895 B2
APPLICATION NO. : 13/261310
DATED : September 29, 2015
INVENTOR(S) : Matthew P. Wilson et al.

It is certified that error appears in the above-identified patent and that said Letters Patent is hereby corrected as shown below:

In the Claims:

Column 3, Line 65:
"ejector gas motive inlet, said recycle at least one" should read, --ejector gas motive inlet, said at least one--.

Column 3, Line 66:
"suction inlet port and a downstream end of said expansion" should read, --suction inlet and a downstream end of said expansion--.

Signed and Sealed this
Tenth Day of May, 2016

Michelle K. Lee
*Director of the United States Patent and Trademark Office*